United States Patent
Thangirala

(10) Patent No.: US 7,843,104 B2
(45) Date of Patent: Nov. 30, 2010

(54) STATOR AND STATOR COMPONENTS OF DYNAMOELECTRIC MACHINES AND PROCESS OF INHIBITING JOULE HEATING THEREIN

(75) Inventor: Subrahmanyam Thangirala, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 12/018,250

(22) Filed: Jan. 23, 2008

(65) Prior Publication Data
US 2009/0195115 A1 Aug. 6, 2009

(51) Int. Cl.
*H02K 3/42* (2006.01)
*H02K 1/12* (2006.01)
*H02K 15/02* (2006.01)

(52) U.S. Cl. .................. 310/216.131; 310/216.004; 310/216.114; 310/256; 310/400; 29/596; 148/321; 420/27

(58) Field of Classification Search .......... 310/216.114, 310/216.004, 216.006, 216.015, 216.016, 310/216.113, 216.118, 216.131, 216.134, 310/400, 256
See application file for complete search history.

(56) References Cited

U.S. PATENT DOCUMENTS

| | | | | |
|---|---|---|---|---|
| 1,677,004 A | | 7/1928 | Pohl | |
| 1,689,188 A | * | 10/1928 | Pohl et al. | 310/256 |
| 3,114,063 A | * | 12/1963 | Karsten | 310/256 |
| 3,238,404 A | * | 3/1966 | Spiess | 310/216.114 |
| 4,054,809 A | | 10/1977 | Jefferies | |
| 4,152,615 A | * | 5/1979 | Calfo et al. | 310/256 |
| 4,484,953 A | * | 11/1984 | Kovacs et al. | 148/545 |
| 2009/0140526 A1 | * | 6/2009 | Jansen et al. | 290/55 |

* cited by examiner

*Primary Examiner*—Burton Mullins
(74) *Attorney, Agent, or Firm*—Ernest G. Cusick; Gary M. Hartman; Domenica N.S. Hartman

(57) ABSTRACT

A stator component whose composition and processing enable the component to axially compress magnetic sheets of a stator and also inhibit joule heating of the component to the extent that the need for a separate flux shield can be eliminated. The component is formed of a ductile iron alloy containing, by weight, about 3.25 to about 3.40% carbon, about 3.70 to about 3.80% silicon, about 4.50 to about 4.70% nickel, up to about 0.20% manganese, up to about 0.06% magnesium, less than 0.02% phosphorus, less than 0.02% sulfur, with the balance being iron and incidental impurities. Following heat treatment, the component exhibits properties that inhibit joule heating of the component by eddy currents induced by alternating magnetic fields of the stator.

20 Claims, 2 Drawing Sheets

STATOR AND STATOR COMPONENTS OF DYNAMOELECTRIC MACHINES AND PROCESS OF INHIBITING JOULE HEATING THEREIN

BACKGROUND OF THE INVENTION

The present invention generally relates to dynamoelectric machines, such as generators used in the production of electrical power. More particularly, this invention relates to minimizing eddy current heating in a stator caused by magnetic fields in end-turn regions of the stator.

Large turbine-driven generators used in the production of electrical power comprise a rotor that serves as a source of magnetic lines of flux produced by a wound coil carried on the rotor. The rotor rotates within a stator that comprises a number of conductors in which an alternating current is induced by the rotor as it rotates within the stator, generating a rotating magnetic field in a narrow air gap between the stator and rotor.

FIG. 1 represents adjacent end portions of a stator 10 and rotor 12 illustrative of the type used in certain dynamoelectric machines, such as turbine-driven generators used to generate electrical power. The stator 10 has a generally annular shape that circumscribes the rotor 12, which is generally a large cylindrical body from which spindles (not shown) extend for rotatably supporting the rotor 12 within the stator 10. The rotor 12 has a series of longitudinal (axially-extending) slots 30 in its outer circumference, which result in radially-extending teeth being defined along the perimeter of the rotor 12. Field windings 32, each comprising multiple insulated conductor strands, are installed in the slots 30 to extend the length of the rotor 12, longitudinally projecting from each end of the rotor 12. The field windings 32 include end turns 34, each of which electrically connects a winding 32 within one slot 30 to a second winding 32 in an adjacent slot 30. As the rotor 12 spins, the end turns 34 are subjected to centrifugal forces that urge the end turns 34 radially outward. This radial movement of the end turns 34 is confined by retaining rings 36 attached to the ends of the rotor 12 to enclose the end turns 34, as shown in FIG. 1.

The stator 10 comprises sheets (punchings) 14 supported in a frame 16 so as to be perpendicular to the common axis of the stator 10 and rotor 12. The sheets 14 are formed of a low loss, low magnetic reluctance material, such as a silicon steel, and compressed against each other in bundles 18, which are axially separated by air gaps 20 maintained by nonmagnetic spacers (not shown) between the sheet bundles 18. Armature windings 24 are positioned in slots (not shown) formed in the sheets 14, and end turns 26 of the windings 24 extend outward from the stator 10 around the rotor retaining ring 36. The extent to which the windings 24 extend beyond the end of the stator 10 is reduced by forming the windings 24 as involutes oriented at an angle to the longitudinal axis of the machine, as represented in FIG. 1.

The sheets 14 of the stator 10 are axially compressed by annular-shaped flanges 22, one of which is shown in FIG. 1. The flanges 22 must have adequate strength to support and maintain the positions of the sheets 14 within the stator 10, and therefore must be formed of high strength material. A common example is ductile iron (cast nodular iron) alloys due to their strength, toughness, and machinability. As a particular example, ASTM A536 GR 60-40-18 ductile iron has been used to form stator flanges in generators produced by the General Electric Company. The alloy composition per the ASTM A536 specification is generic in nature, subordinates chemical composition to mechanical properties, and is not optimized for electrical or magnetic permeability properties. As such, components formed of ASTM A536 are mainly chosen to meet mechanical properties and obtain a spheroidal graphite microstructure with a predominantly ferritic matrix. A typical commercial grade of the ASTM A536 alloy contains, by weight, at least 3.0% carbon, at least 1.7% silicon, at least 0.03% magnesium, less than 0.1% phosphorus, less than 0.025% sulfur, the balance iron and incidental impurities.

In a stator 10 having the construction described above, magnetic flux is generated by the end turns 26 and directed parallel to the longitudinal axis of the machine toward the major surfaces of the sheets 14. This magnetic flux induces large eddy currents in the sheets 14 that cause a significant amount of joule (ohmic) heating in the sheets 14, and consequently heating of the stator flanges 22. The alternating magnetic fields of the stator 10 also induce eddy currents in the stator flanges 22, resulting in further heating of the flanges 22. In addition to energy losses that reduce the efficiency of the machine, heating of the sheets 14 and flanges 22 in the vicinity of the stator ends can be sufficient to cause local overheating that is detrimental to the operation of the machine.

For this reason, the stator 10 is shown equipped with an annular-shaped flux shield 28 located adjacent the flange 22 and secured by, for example, straps (as shown), fasteners, etc. Examples of flux shields include U.S. Pat. No. 1,677,004 to Pohl and U.S. Pat. No. 4,054,809 to Jefferies. The flux shield 28 is formed of a material such as copper or a copper alloy so that magnetic flux is concentrated in the shield 28, rather than in the flange 22. As a result, power losses in the machine can be significantly reduced, thereby increasing the overall efficiency of the machine and reducing temperatures within the sheets 14 at the ends of the stator 10. However, a drawback is that the flux shield 28 is heated by the eddy currents, resulting in heating of the shield 28 and heat transfer to the flange 22 by conduction and/or convection. The flux shield 28 also adds complexity and cost to the machine. Accordingly, it would be desirable if the flux shields 28 could be eliminated as separate discrete components of large dynamoelectric machines.

BRIEF SUMMARY OF THE INVENTION

The present invention provides a stator component whose composition and processing enable the component to axially compress magnetic sheets of the stator and also inhibit joule heating to the extent that the need for a separate flux shield can be eliminated.

According to a first aspect of the invention, the component is adapted for use in a stator used in combination with a rotor in a dynamoelectric machine, such that alternating magnetic fields are induced in the stator. The stator includes magnetic sheets oriented approximately perpendicular to an axis of the stator, and stator windings passing through the magnetic sheets in a direction approximately parallel to the axis of the stator. The component is configured and located on the stator to axially compress the magnetic sheets of the stator together. The component is formed of a ductile iron alloy containing, by weight, about 3.25 to about 3.40% carbon, about 3.70 to about 3.80% silicon, about 4.5 to about 4.7% nickel, up to about 0.20% manganese, up to about 0.06% magnesium, less than 0.02% phosphorus, less than 0.02% sulfur, with the balance being iron and incidental impurities. The component exhibits properties that significantly inhibit joule heating of the component by eddy currents induced by alternating magnetic fields of the stator.

According to a second aspect of the invention, the component is formed by a process that includes casting a ductile iron alloy containing, by weight, about 3.25 to about 3.40% carbon, about 3.70 to about 3.80% silicon, about 4.5 to about 4.7% nickel, up to about 0.20% manganese, up to about 0.06% magnesium, less than 0.02% phosphorus, less than 0.02% sulfur, with the balance being iron and incidental impurities. The resulting casting is then subjected to a two-stage heat treatment cycle, starting with a first heat treatment at a first soak temperature of about 910±20° C. for about three hours±30 minutes, then a second heat treatment at a second soak temperature of about 690±20° C. for about six hours±30 minutes. Cooling can be performed by conventional methods capable of a sufficiently controlled cooling rate that avoids significant hardening and grain growth in the casting. For example, furnace cooling techniques provide such a capability, whereas cooling techniques such as conventional air cooling and liquid quenching techniques do not.

A significant advantage of this invention is that the component as described above is capable of exhibiting a desirable combination of strength, magnetic permeability, and electrical resistivity. This combination of properties enables the component to be less prone to joule heating, to the extent that stator end heating can be minimized without the requirement for a separate component capable of a magnetic shielding effect. The component achieves these benefits while simultaneously being capable of providing sufficient strength to support and maintain the positions of the sheets within the stator.

Other objects and advantages of this invention will be better appreciated from the following detailed description.

DETAILED DESCRIPTION OF THE INVENTION

Figure 1:
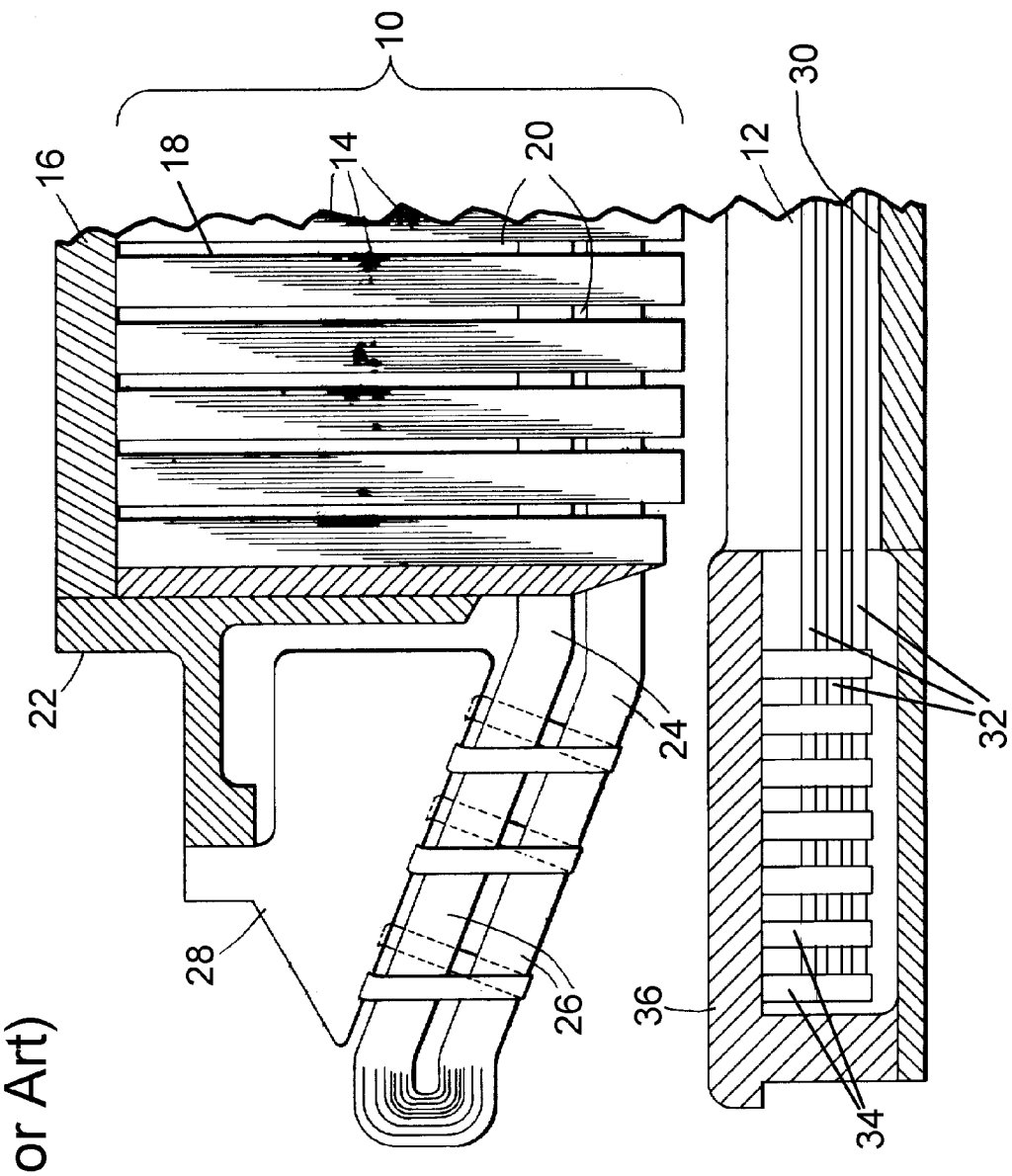
FIG. 1 is a partial sectional view of a stator and rotor in a dynamoelectric machine, with the stator shown as being equipped with a separate flux shield in accordance with the prior art.
Figure 2:
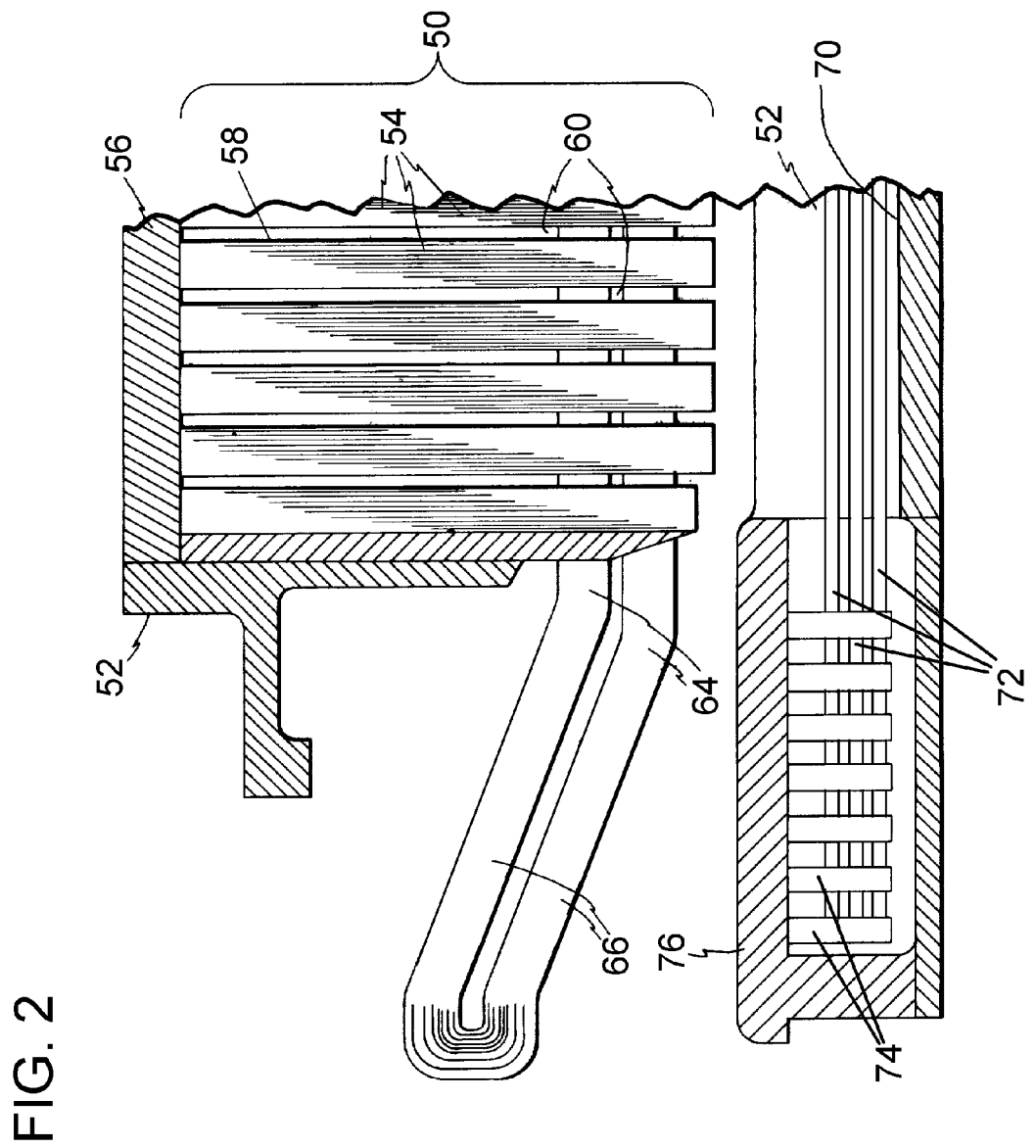
FIG. 2 is a partial sectional view of a stator and rotor similar to that of FIG. 1, but with the flux shield eliminated as a result of a modified stator flange in accordance with the present invention.

A stator 50 for a dynamoelectric machine is represented in FIG. 2. The stator 50 and its components are merely illustrative, and their particular configurations are not to be interpreted as limiting the scope of the invention, aside from properties and characteristics necessary for use in a dynamoelectric machine. Similar to the prior art stator 10 of FIG. 1, the stator 50 has a plurality of thin sheets 54 of low loss, low magnetic reluctance material, such as high quality silicon steel, supported in a frame 56. The sheets 54 are assembled in bundles 58 separated by air gaps 60 created by nonmagnetic spacers (not shown) between the bundles 58. As part of a dynamoelectric machine, such as a generator used in the production of electrical power, a rotor 52 is rotatably supported coaxially within the stator 50. The rotor 52 has field windings 72 that are located in longitudinal (axially-extending) slots 70 in its outer circumference and longitudinally project from the end of the rotor 52. The field windings 72 include end turns 74 confined by retaining rings 76 attached to the core end of the rotor 52. The stator 50 includes armature windings 64 positioned in slots (not shown) formed in the sheets 54, with end turns 66 of the windings 64 extending outward from the stator 50 around the rotor retaining ring 76.

As in the case of the stator 10 represented in FIG. 1, the sheets 54 of the stator 50 are axially compressed by stator flanges 62, one of which is shown in cross-section in FIG. 2. The flange 62 is depicted as being at the core end of the stator 50 with its outer perimeter abutting the stator frame 56. The flange 62 generally has an annular shape that is coaxial with the stator 50, and as such a cross-section of the lower portion (not shown) of the flange 62 diametrically opposed from the portion shown would have a cross-section that is substantially a mirror image of the portion shown. As before, the stator flanges 62 must have adequate strength to axially compress the sheets 54 together in order to support and maintain the positions of the sheets 54 within the stator 50. For this reason, the flanges 62 must be formed of a high strength material. However, as evident from comparing FIGS. 1 and 2, the stator 50 of FIG. 2 lacks a separate flux shield adjacent its end turns 74. In the absence of a flux shield, such as the shield 28 shown in FIG. 1, the end turns 74 of the rotor 52 create magnetic flux that induces eddy currents in the sheets 54 of the stator 50, thereby reducing the efficiency of the machine and inducing joule heating that can potentially lead to excessive temperatures in the sheets 54, as well as in the flanges 62 located at the ends of the stator 50. According to a preferred embodiment of the invention, the flanges 62 are formed of a material and are processed to have properties that make possible the elimination of the flux shields 28 of the prior art stator 10 of FIG. 1. In addition to reduced material and manufacturing costs, the elimination of the flux shields 28 also possibly allows for improved cooling flow through the stator 10.

According to a first aspect of the invention, the flanges 62 are formed of a ductile iron (cast nodular iron) alloy that exhibits desirable strength, toughness, and machinability properties, as well as desirable magnetic properties. Suitable, preferred, and nominal compositions (approximate, by weight percent) for the ductile iron alloy are summarized in Table I below.

TABLE I

| Constituent | Suitable | Preferred | Nominal |
| --- | --- | --- | --- |
| Carbon | 3.25-3.40 | 3.25-3.30 | 3.25 |
| Silicon | 3.70-3.80 | 3.72-3.78 | 3.75 |
| Nickel | 4.50-4.70 | 4.55-4.65 | 4.60 |
| Manganese | up to 0.20 | 0.17-0.20 | 0.185 |
| Magnesium | up to 0.06 | 0.035-0.06 | 0.0375 |
| Phosphorous | <0.02 | <0.02 | <0.02 |
| Sulfur | <0.02 | <0.02 | <0.02 |
| Iron | balance | balance | balance |

The alloy may also contain incidental impurities, for example, preferably less than 0.002% lead, less than 0.001% antimony, less than 0.01% tin, less than 0.02% arsenic, less than 0.05% aluminum, and less than 0.02% tellurium. Castings of the alloy preferably have a metallurgical microstructure containing spheroidal graphite iron nodularity of greater than 90% and a desirable nodule count. Desired metallurgical microstructures in the alloy castings can be confirmed through the use of cast-on test coupons per ASTM standard A536, on the basis that such test coupons contain spheroidal graphite iron nodularity of greater than 90% and a nodule count of greater than 100 per square millimeter.

In an investigation reported below, it was determined that, regardless of silicon content, increasing nickel content in a range of about 0.2 to 5.0 weight percent coincided with increasing resistivity (specific resistance), and regardless of nickel content, increasing silicon content in a range of about 2.5 to 4.2 weight percent coincided with increasing resistivity in the alloy. It was also determined that permeability in as-cast alloys decreased with increasing nickel content regardless of silicon content. Magnetic permeability influences eddy current response and has a significant effect over conductivity, while eddy current losses due to joule heating can be reduced by increasing resistivity. As such, high permeability and resistivity are believed to be desirable properties for minimizing joule heating of the flanges 62, yet neither was attained by simply increasing the silicon and nickel contents of alloy specimens prepared for investigations leading to this invention.

Alloys prepared for the investigations are summarized in Table II below, as are certain mechanical and magnetic properties of the alloys. In Table II, "AC" identifies alloys in the as-cast condition, and "HT" identifies alloys whose compositions are similar to the numerically corresponding AC alloys (e.g., HT1 to AC1) but further underwent heat treatment in an attempt to influence the permeability and resistivity of the alloys. Heat treatment of ferritic ductile irons tends to improve electrical resistivity properties with ferritization. In the investigation, two-stage heat treatments were devised in an attempt to improve electrical and magnetic permeability properties of the ductile iron alloys being evaluated. All heat treatments entailed heat from room temperature to a soak temperature of about 910±20° C. at a rate of about 2° C./minute, holding at the soak temperature for about three hours±30 minutes, cooling from the soak temperature to a second soak temperature of about 690±20° C. at a rate of about 1° C./minute, holding at the second soak temperature for about six hours±30 minutes, cooling from the second soak temperature to a temperature of about 200±20° C. at a rate of about 1.5° C./minute, and then air cooling to room temperature.

TABLE II

| Alloy No. | Composition (weight %) | | | | UTS (ksi) | Resistivity (μ-ohm · cm) | Max. Permeability (H/m) |
|---|---|---|---|---|---|---|---|
| | C | Si | Ni | Fe | | | |
| AC1 | 3.54 | 2.58 | 0.32 | bal. | 44.9 | 53.2 | 1557 |
| AC2 | 3.57 | 2.48 | 0.24 | bal. | 43.3 | 52.8 | 1619 |
| AC3 | 3.24 | 3.08 | 1.44 | bal. | 62.3 | 60.0 | 856 |
| AC4 | 3.37 | 3.74 | 1.43 | bal. | 71.9 | 67.7 | 1443 |
| AC5 | 3.31 | 3.10 | 4.86 | bal. | 85.5 | 63.6 | 490 |
| AC6 | 3.28 | 3.75 | 4.60 | bal. | 99.5 | 73.7 | 755 |
| AC7 | 3.27 | 3.95 | 11.3 | bal. | 108.8 | 77.2 | 61 |
| HT1 | 3.50 | 2.53 | 0.22 | bal. | 41.8 | 54.2 | 2085 |
| HT2 | 3.53 | 2.56 | 0.24 | bal. | 43.8 | 54.2 | 1865 |
| HT3 | 3.25 | 3.15 | 1.51 | bal. | 57.1 | 60.1 | 1609 |
| HT4 | 3.26 | 3.93 | 1.54 | bal. | 70.3 | 70.3 | 1894 |
| HT5 | 3.25 | 3.14 | 4.92 | bal. | 76.4 | 62.3 | 1203 |
| HT6 | 3.26 | 4.12 | 5.58 | bal. | 91.5 | 73.4 | 1174 |
| HT7 | 3.38 | 4.16 | 11.2 | bal. | 111.0 | 77.5 | 66 |

From the results in Table II it can be seen that strength increased with increasing silicon and nickel levels, but that permeability decreased with increasing nickel content. Furthermore, for alloys with nickel levels of about 1.4 to 1.5% (AC3, AC4, HT3, and HT4) and about 4.6 to 5.6% (AC5, AC6, HT5, and HT6), increasing silicon contents resulted in improved permeability and slightly higher resistivities. Still further, by comparing the alloys with silicon levels of about roughly 4% (AC6, AC7, HT6, and HT7), it can be seen that increasing nickel contents were responsible for slightly higher resistivities but drastically lower permeabilities. For alloys having the lowest nickel contents (AC1, AC2, HT1, and HT2), low resistivities (below 55 μ-ohm·cm) were obtained, and improved permeability could be achieved through heat treatment (comparing HT1 and HT2 to AC1 and AC2). Finally, by comparing the heat treated alloys (HT1-HT7) to the untreated alloys with similar compositions (AC1-AC7, respectively), it can be seen that all heat treated alloys significantly outperformed their corresponding untreated alloys in terms of permeability, and six of the seven heat treated alloys exhibited higher resistivities relative to their corresponding untreated alloys, the exception being the approximately equal resistivities exhibited by alloys AC6 and HT6. As such, the investigation showed that the heat treatment could increase permeabilities and resistivities over those obtained in the as-cast condition for the alloys evaluated.

Based on the above results, the alloy compositions approximately corresponding to AC6 and HT6 were identified as exhibiting a desirable balance of properties, such as a resistivity of at least 70 μ-ohm·cm and a maximum permeability of at least 500 H/m, that would render a stator flange 62 formed of these materials capable of eliminating the requirement for a separate component (e.g., shield 28) having a magnetic flux shielding capability. In view of the effect that high nickel levels had on permeability, it was concluded that a heat treated alloy having a composition closer to that of AC6 than HT6, corresponding to the nominal composition of Table I, would more nearly exhibit optimal properties. Finally, limited additions of manganese as set forth in Table I are capable of improving mechanical properties, while limited additions of magnesium as set forth in Table I are desirable to obtain the desired nodular graphite shape and offset deleterious effects of impurities.

In terms of power loss characteristics that might be expected for a generator whose stator 50 utilizes a flange 62 formed of an alloy of this invention, it should be noted that a slender, small-area hysteresis (BH) loop corresponds to reduced power losses. In particular, a slender BH loop indicates low retentivity, low residual field, and easier magnetization with low reluctance. Furthermore, a higher saturation induction (Bs) with a small hysteresis loop is desirable to minimize the size of the stator. The relatively high permeabilities and resistivities of the alloy set forth in Table I is believed to provide such benefits.

While the invention has been described in terms of particular embodiments, it is apparent that other forms could be adopted by one skilled in the art. For example, the physical configuration of the flange 62 and the dynamoelectric machine (including the stator 50 and rotor 52) in which it is used could differ from that shown. Therefore, the scope of the invention is to be limited only by the following claims.

The invention claimed is:

1. A stator adapted for use in combination with a rotor in a dynamoelectric machine such that alternating magnetic fields are induced in the stator, the stator comprising:

magnetic sheets oriented approximately perpendicular to an axis of the stator, and stator windings passing through the magnetic sheets in a direction approximately parallel to the axis of the stator; and means for axially compressing the magnetic sheets of the stator together, the compressing means being formed of a ductile iron alloy containing, by weight, about 3.25 to about 3.40% carbon, about 3.70 to about 3.80% silicon, about 4.50 to about 4.70% nickel, up to about 0.20% manganese, up to about 0.06% magnesium, less than 0.02% phosphorus, less than 0.02% sulfur, with the balance being iron and incidental impurities, wherein the ductile iron alloy exhibits a resistivity of at least 70 μ-ohm·cm and a maximum permeability of at least 500H/m and the compressing means exhibits properties that inhibit joule heating of the component by eddy currents induced by alternating magnetic fields of the stator.

2. The stator according to claim 1, wherein the compressing means comprises a pair of components located at the ends of the stator.

3. The stator according to claim 2, wherein the stator comprises end turns of the stator windings that extend from oppositely-disposed ends of the stator, and the components are located radially-outward from the end turns.

4. The stator according to claim 2, wherein the components are annular-shaped and coaxial with the stator.

5. The stator according to claim 1, wherein the stator lacks a separate flux shield mounted at the ends of the stator in addition to the compressing means.

6. The stator according to claim 1, wherein the stator is installed in the dynamoelectric machine.

7. The stator according to claim 6, wherein the dynamoelectric machine is a generator adapted for use in the production of electrical power.

8. The stator according to claim 1, wherein the compressing means abuts a corresponding one of the magnetic sheets at one of the ends of the stator.

9. The stator according to claim 1, wherein the ductile iron alloy consists of, by weight, about 3.25 to about 3.40% carbon, about 3.70 to about 3.80% silicon, about 4.50 to about 4.70% nickel, about 0.17 to about 0.20% manganese, about 0.035 to about 0.06% magnesium, less than 0.02% phosphorus, less than 0.02% sulfur, with the balance being iron and incidental impurities, and the ductile iron alloy has a metallurgical microstructure containing spheroidal graphite iron nodularity of greater than 90%.

10. The stator according to claim 9, wherein the ductile iron alloy contains, by weight, about 3.25 to about 3.30% carbon, about 3.72 to about 3.78% silicon, and about 4.55 to about 4.65% nickel.

11. A stator adapted for use in combination with a rotor in a dynamoelectric machine such that alternating magnetic fields are induced in the stator, the stator comprising:
    magnetic sheets oriented approximately perpendicular to an axis of the stator, and stator windings passing through the magnetic sheets in a direction approximately parallel to the axis of the stator; and
    means for axially compressing the magnetic sheets of the stator together, the compressing means being formed of a ductile iron alloy containing, by weight, about 3.25 to about 3.40% carbon, about 3.70 to about 3.80% silicon, about 4.50 to about 4.70% nickel, about 0.17 to about 0.20% manganese, up to about 0.06% magnesium, less than 0.02% phosphorus, less than 0.02% sulfur, with the balance being iron and incidental impurities, wherein the ductile iron alloy has a metallurgical microstructure containing spheroidal graphite iron nodularity of greater than 90% and the compressing means exhibits properties that inhibit joule heating of the component by eddy currents induced by alternating magnetic fields of the stator.

12. A process of inhibiting joule heating of a component in a stator adapted for use in combination with a rotor of a dynamoelectric machine such that alternating magnetic fields are induced in the stator, the stator comprising magnetic sheets oriented approximately perpendicular to an axis of the stator and stator windings passing through the magnetic sheets in a direction approximately parallel to the axis of the stator, the process comprising:
    forming at least one component adapted for axially compressing the magnetic sheets of the stator together, the forming step comprising:
        casting a ductile iron alloy containing, by weight, about 3.25 to about 3.40% carbon, about 3.70 to about 3.80% silicon, about 4.50 to about 4.70% nickel, up to about 0.20% manganese, up to about 0.06% magnesium, less than 0.02% phosphorus, less than 0.02% sulfur, with the balance being iron and incidental impurities; and then
        heat treating the ductile iron alloy at a first soak temperature of about 910±20° C. for about three hours±30 minutes, and then at a second soak temperature of about 690±20° C. for about six hours±30 minutes.

13. The process according to claim 12, further comprising the step of installing the component at a first end of the stator and abutting one of the magnetic sheets thereat, wherein a separate flux shield is not mounted at the first end of the stator in addition to the component.

14. The process according to claim 13, wherein the stator comprises end turns of the stator windings that extend from oppositely-disposed ends of the stator, and the components are installed radially-outward from the end turns.

15. The process according to claim 12, further comprising the step of installing the stator in the dynamoelectric machine.

16. The process according to claim 12, further comprising the step of operating the dynamoelectric machine as a generator to produce electrical power.

17. The process according to claim 12, wherein the ductile iron alloy consists of, by weight, about 3.25 to about 3.40% carbon, about 3.70 to about 3.80% silicon, about 4.50 to about 4.70% nickel, about 0.17 to about 0.20% manganese, about 0.035 to about 0.06% magnesium, less than 0.02% phosphorus, less than 0.02% sulfur, with the balance being iron and incidental impurities, and the ductile iron alloy has a metallurgical microstructure containing spheroidal graphite iron nodularity of greater than 90%.

18. The process according to claim 17, wherein the ductile iron alloy contains, by weight, about 3.25 to about 3.30% carbon, about 3.72 to about 3.78% silicon, and about 4.55 to about 4.65% nickel.

19. The process according to claim 12, wherein the ductile iron alloy exhibits a resistivity of at least 70 µ-ohm·cm and a maximum permeability of at least 500H/m.

20. The process according to claim 12, wherein the heat treating step comprises heat from room temperature to the first soak temperature at a rate of about 2° C./minute, cooling from the first soak temperature to the second soak temperature at a rate of about 1° C./minute, cooling from the second soak temperature to a temperature of about 200±20° C. at a rate of about 1.5° C./minute, and then air cooling to room temperature.

* * * * *